United States Patent
Montagna et al.

(10) Patent No.: US 7,163,253 B2
(45) Date of Patent: Jan. 16, 2007

(54) METHOD OF MANUFACTURING COMPOSITE VEHICLE PANELS

(75) Inventors: John C. Montagna, Metamora, MI (US); Leslie E. Smith, Lapeer, MI (US)

(73) Assignee: Durakon Industries, Inc., Lapeer, MI (US)

( * ) Notice: Subject to any disclaimer, the term of this patent is extended or adjusted under 35 U.S.C. 154(b) by 0 days.

(21) Appl. No.: 10/748,401

(22) Filed: Dec. 30, 2003

(65) Prior Publication Data

US 2005/0140177 A1 Jun. 30, 2005

(51) Int. Cl.
*B60J 7/00* (2006.01)
(52) U.S. Cl. .............. 296/100.02; 296/191; 428/122; 52/783.19; 156/210
(58) Field of Classification Search ........... 296/191, 296/100.02, 181.2, 181.3, 193.11; 428/122, 428/182; 52/783.19; 156/291, 285, 210, 156/217
See application file for complete search history.

(56) References Cited

U.S. PATENT DOCUMENTS

| | | | |
|---|---|---|---|
| 1,943,757 A | 1/1934 | Delaney | |
| 2,043,519 A | 6/1936 | Rowe | |
| 2,055,032 A | 9/1936 | Johnson | |
| 2,900,965 A | 8/1959 | Witzke | |
| 3,216,167 A | 11/1965 | Roberts | |
| 3,393,920 A | 7/1968 | Ehrlich | |
| 3,762,762 A | 10/1973 | Beveridge et al. | |
| 3,785,698 A | 1/1974 | Dean et al. | |
| 3,832,820 A | 9/1974 | Eggert | |
| 3,881,768 A | 5/1975 | Nix | |
| 3,970,324 A | 7/1976 | Howat | |
| 4,044,083 A | 8/1977 | Howe et al. | |
| 4,075,380 A | 2/1978 | Moens | |
| 4,079,989 A | 3/1978 | Robertson | |
| 4,124,247 A | 11/1978 | Penner | |
| 4,150,186 A | 4/1979 | Kazanna | |
| 4,161,335 A | 7/1979 | Nix et al. | |
| 4,321,780 A | 3/1982 | Hooper et al. | |
| 4,324,429 A | 4/1982 | Wilson et al. | |
| 4,341,412 A | 7/1982 | Wayne | |
| 4,361,613 A | 11/1982 | Bogner et al. | |
| 4,420,183 A | 12/1983 | Sherman | |
| 4,463,043 A | 7/1984 | Reeves et al. | |
| 4,585,683 A | 4/1986 | Curnow | |
| 4,635,422 A | 1/1987 | Nowack et al. | |
| 4,651,488 A | 3/1987 | Nicholas et al. | |
| 4,676,938 A | 6/1987 | Karklin et al. | |
| 4,687,691 A | 8/1987 | Kay | |

(Continued)

OTHER PUBLICATIONS

PCT International Search Report, May 16, 2006.

(Continued)

*Primary Examiner*—Joseph D. Pape
(74) *Attorney, Agent, or Firm*—Flaster/Greenberg P.C.

(57) ABSTRACT

A method of fabricating composite vehicle panels includes the steps of forming a first, upper panel having a depending peripheral lip, forming a second, lower panel of laid up woven mat or strips of a fibrous material such as fiberglass or carbon fibers and a plastic resin to form a corrugated panel having a depending peripheral lip, placing an adhesive on the raised portions of the corrugations and the peripheral lip of the second panel and securing the panels together at the corrugations and about their peripheral lips.

11 Claims, 4 Drawing Sheets

U.S. PATENT DOCUMENTS

| | | |
|---|---|---|
| 4,693,507 A | 9/1987 | Dresen et al. |
| 4,762,360 A | 8/1988 | Huber |
| 4,769,106 A | 9/1988 | Busching |
| 4,773,126 A | 9/1988 | Voss |
| 4,801,483 A | 1/1989 | Beckerman et al. |
| 4,832,394 A | 5/1989 | Macomber |
| 4,835,034 A | 5/1989 | Cruz |
| 4,849,277 A | 7/1989 | Jaklofsky |
| 4,857,380 A | 8/1989 | Kent |
| 4,917,431 A | 4/1990 | McDonald |
| 4,941,705 A | 7/1990 | Wurtz |
| 4,958,876 A | 9/1990 | Diaco et al. |
| 4,963,408 A | 10/1990 | Huegli |
| 4,980,214 A | 12/1990 | Charriere |
| 5,007,670 A | 4/1991 | Wise |
| 5,018,777 A | 5/1991 | Swenson et al. |
| 5,020,294 A | 6/1991 | Duda |
| 5,104,715 A | 4/1992 | Cruz |
| 5,139,300 A | 8/1992 | Carriere |
| 5,185,980 A | 2/1993 | Rydberg et al. |
| 5,186,517 A | 2/1993 | Ronai |
| 5,221,119 A | 6/1993 | Emery |
| 5,228,736 A | 7/1993 | Dutton |
| 5,269,447 A | 12/1993 | Gower et al. |
| 5,275,860 A | 1/1994 | D'Luzansky et al. |
| 5,322,336 A | 6/1994 | Isler |
| 5,338,594 A | 8/1994 | Wang et al. |
| 5,348,778 A | 9/1994 | Knipp et al. |
| 5,365,713 A | 11/1994 | Nicholas et al. |
| 5,385,377 A | 1/1995 | Girard |
| 5,462,623 A | 10/1995 | Day |
| 5,492,663 A | 2/1996 | Greenwald et al. |
| 5,503,450 A | 4/1996 | Miller |
| 5,540,475 A | 7/1996 | Keasting et al. |
| 5,553,652 A | 9/1996 | Rushford |
| 5,569,508 A | 10/1996 | Cundiff |
| 5,589,243 A | 12/1996 | Day |
| 5,624,726 A | 4/1997 | Sanocki et al. |
| 5,631,522 A | 5/1997 | Gaitan et al. |
| 5,648,031 A | 7/1997 | Sturtevant et al. |
| 5,655,808 A | 8/1997 | Wheatley |
| 5,658,523 A | 8/1997 | Shuert |
| 5,688,017 A | 11/1997 | Bennett |
| 5,741,574 A | 4/1998 | Boyce et al. |
| 5,743,586 A | 4/1998 | Nett |
| 5,834,082 A | 11/1998 | Day |
| 5,860,691 A | 1/1999 | Thomsen et al. |
| 5,885,691 A | 3/1999 | Breezer et al. |
| 5,899,519 A | 5/1999 | Doshi |
| 5,904,393 A | 5/1999 | Yoder |
| 5,927,788 A | 7/1999 | Long |
| 5,928,772 A | 7/1999 | Shiraishi et al. |
| 5,935,675 A | 8/1999 | Hayden et al. |
| 5,957,525 A | 9/1999 | Nelson |
| 6,024,396 A | 2/2000 | Doshi |
| 6,042,173 A | 3/2000 | Nett |
| 6,109,681 A | 8/2000 | Edwards |
| 6,200,122 B1 | 3/2001 | Chun et al. |
| 6,217,102 B1 | 4/2001 | Lathers |
| 6,224,706 B1 | 5/2001 | Matich |
| 6,231,938 B1 | 5/2001 | Gockel et al. |
| 6,237,980 B1 | 5/2001 | Miles et al. |
| 6,294,114 B1 | 9/2001 | Muirhead |
| 6,340,194 B1 | 1/2002 | Muirhead et al. |
| 6,520,558 B1 | 2/2003 | Katterloher et al. |
| 6,588,826 B1 | 7/2003 | Muirhead |
| 6,739,673 B1* | 5/2004 | Gupta et al. ............ 297/452.65 |
| 2004/0021342 A1* | 2/2004 | Fujimoto ............... 296/193.11 |

OTHER PUBLICATIONS

STK, LLC ProCover™ Product Brochure - 2 pages (date unknown).

\* cited by examiner

METHOD OF MANUFACTURING COMPOSITE VEHICLE PANELS

BACKGROUND OF THE INVENTION

The invention relates generally to a method for manufacturing a composite panel and more particularly to a method of fabricating and assembling composite panels for use on motor vehicles such as pickup trucks, crossover vehicles, SUV's and the like.

The continuing popularity of pickup trucks and crossover vehicles having a passenger compartment smaller than an SUV but also including a truck bed has created a growing market for accessories for these vehicles. One of the most popular accessories is a closure or tonneau cover for the truck bed. Characterized most simply, the tonneau cover is a horizontally disposed structure which covers the truck bed and engages and is supported by the rails of the truck bed.

There the simplicity ends because this seemingly utilitarian device is subject to many structural and operational requirements. First of all, the closure or tonneau cover must generally not be stationary but must be movable to permit access to the truck or bed by being hinged along its juncture with the front rail of the truck bed or by including center hinges pivoting along the longitudinal axis of the truck bed to provide access into the truck bed from either the left side of the truck, the right side of the truck or both. Given the likelihood of hauling valuable cargo in the truck bed, the tonneau cover must also include a locking feature in order to be locked to provide a reasonable degree of security.

Structurally, the cover must be strong and dimensionally stable. Since the cover will be subjected to typical ambient extremes of temperature as well as heating from the sun and weight from heavy snow or an object placed thereupon, it must exhibit exceptional strength and ruggedness.

Cosmetically, the product is demanding as well since the product finish must accept paint and result in a surface appearance rivaling that of painted sheet metal in order to be acceptable to purchasers.

Last of all, given the size of such tonneau covers, typically four feet by six feet (1.22 m by 1.83 m) and frequently larger, it is necessary that the issue of total weight be considered and addressed in order to not adversely impact the overall vehicle weight and fuel economy of the vehicle.

All of the foregoing requirements are addressed by the method and resulting product described more fully below.

SUMMARY OF THE INVENTION

A method of fabricating composite vehicle panels includes the steps of forming a first, upper panel having a depending peripheral lip, forming a second, lower panel of a laid up woven mat or strips of a fibrous material such as fiberglass or carbon fibers and a plastic resin to form a corrugated panel having a depending peripheral lip, placing an adhesive on the raised portions of the corrugations and the peripheral lip of the second panel and securing the panels together at the corrugations and about their peripheral lips. An elastomeric channel may be disposed over the adjacent ends of the lips and functions as a bumper and weather strip. The product produced by this method is also disclosed and claimed.

Thus it is an object of the present invention to provide a method of fabricating composite vehicle panels.

It is a further object of the present invention to provide a method of fabricating composite vehicle panels having a lower panel including a plurality of corrugations which are secured by an adhesive to an upper panel.

It is a still further object of the present invention to provide a method of fabricating composite vehicle panels which are secured together about their peripheries.

It is a still further object of the present invention to provide a product manufactured in accordance with the disclosed process.

Further objects and advantages of the present invention will become apparent by reference to the following description of the preferred embodiment and appended drawings wherein like reference numbers refer to the same component, element, or feature.

DETAILED DESCRIPTION OF THE PREFERRED EMBODIMENT

Figure 1:
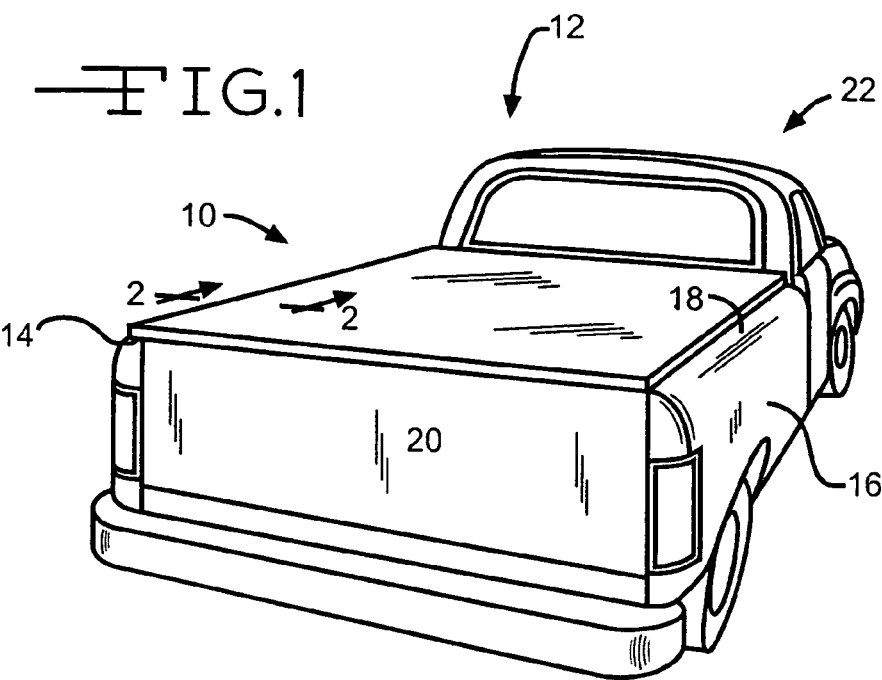
FIG. 1 is a perspective view of a composite panel according to the present invention utilized as a tonneau cover for the bed of a pickup truck.
Figure 2:
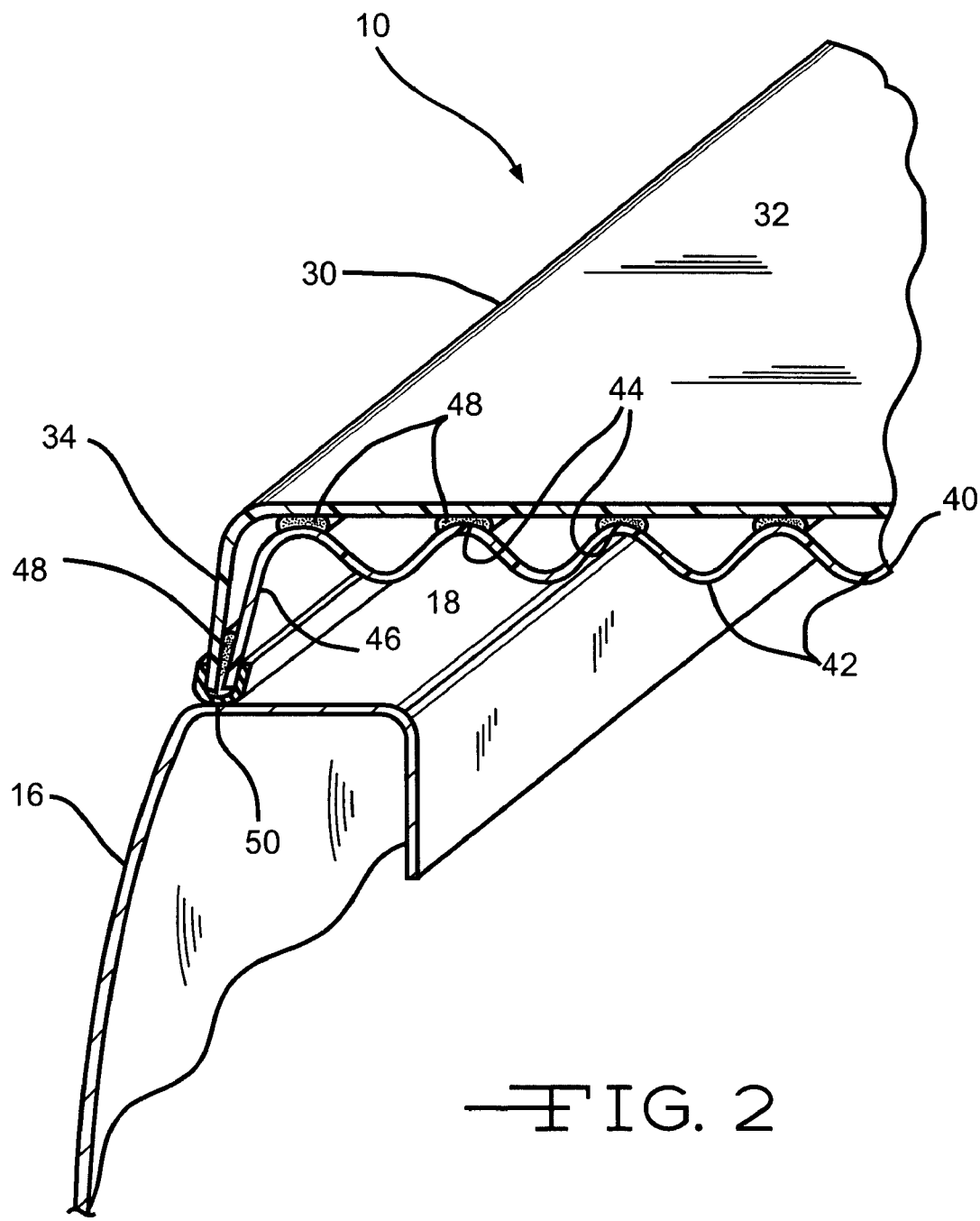
FIG. 2 is an enlarged, fragmentary, sectional view of a composite panel according to the present invention utilized as a tonneau cover, taken along line 2—2 of FIG. 1.

Referring now to FIGS. 1 and 2, a composite vehicle panel is illustrated and generally designated by the reference number 10. The composite vehicle panel 10 is generally referred to as a tonneau cover but may be one of several different vehicular panels such as a floorboard, a door panel, a roof panel or other generally planar body panel for use on or with a motor vehicle such as a pickup truck 12. If a tonneau cover, the composite panel 10 is fitted over the open top of a truck bed 14 having a pair of opposed, spaced apart sidewalls 16 defining horizontal, longitudinally extending rails 18. The sidewalls 16 are connected by a front wall (not illustrated) and a horizontal bottom panel (also not illustrated). The pickup truck 12 also includes a tailgate assembly 20 and a cab 22. It will be appreciated that the pickup truck 12 illustrated is conventional and representative of a broad range of pickup trucks and crossover and other vehicles having an exterior cargo bed.

Referring now to FIG. 2, the composite vehicle panel 10 includes a first or upper panel 30 having a central planar surface 32 and a peripheral depending flange or lip 34 which extends about the periphery of the central planar surface 32 and downwardly therefrom. The composite vehicle panel 10 also includes a second or lower panel 40 which defines a plurality of elongate ribs or corrugations 42 having raised elongate surfaces 44 and a depending peripheral flange or lip 46 which extends about the entire periphery of the panel 40. The inside dimensions of the first or upper panel 30 adjacent the terminal portion of the peripheral edge or lip 34, i.e., the length, width and radiused corners are preferably equal to the outside dimensions adjacent the terminal portion of the peripheral lip 46 of the second panel 40. A bead of adhesive 48 resides between and secures the raised elongate surfaces 44 of the elongate corrugations 42 as well as the inner surface of the peripheral lip 34 and the outer surface of the peripheral lip 46 to one another as illustrated. Preferably, a U-shaped elastomeric channel 50 is disposed over the adjacent edges of the lips 34 and 46. Both an interference fit and the adhesive 48 retain the U-shaped channel 50 on the lips 34 and 46. The U-shaped channel 50 functions as a cosmetic feature, a bumper to cushion contact with the rails 18 of the truck bed 14, and as a weather seal between the tonneau cover 10 and the rails 18.

Figure 3:
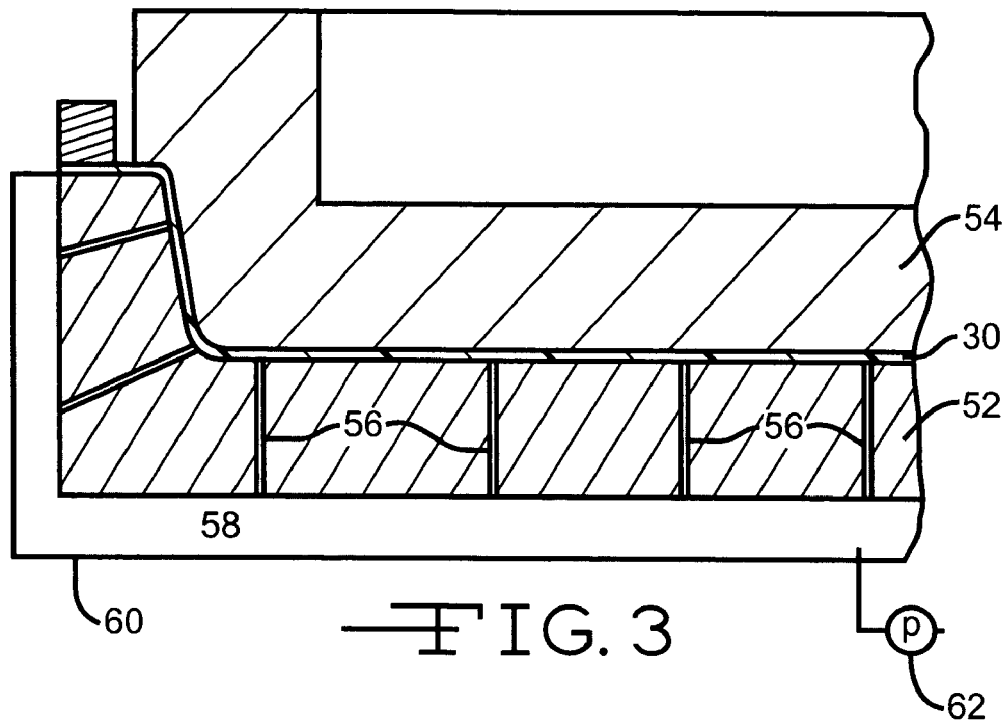
FIG. 3 is an enlarged, fragmentary, sectional view of upper and lower mold segments illustrating the production of a first or upper panel according to the present invention.

Turning now to FIGS. 3, 4, 5, 6 and 7, the steps of fabricating and assembling the composite vehicle panel 10 will now be described. Turning first to FIG. 3, a conventional thermoforming die having a first or lower female mold segment 52 and, optionally, a second or upper matching male mold segment 54 are utilized. Whether the second or upper matching mold segment 54 is utilized or the upper panel 30 is vacuum formed against only the first or lower mold segment 52 is determined by the characteristics of the material being formed and the desired amount of detail on the panel 30. The lower female mold segment 52 preferably includes a plurality of vacuum passageways 56 which communicate from the mold surface of the mold segment 52 to a plenum 58 which is defined by a plenum wall 60 on the back side of the female mold segment 52. A vacuum pump 62 draws a partial vacuum in the plenum 58 such that air is drawn through the passageways 56 and the panel 30 is drawn into intimate contact with the surface of the female mold segment 52. Assisting such accurate thermoforming is the optional male mold segment 54 which is moved into intimate contact with the face of the panel 30 opposite the female mold segment 52. When the panel 30 has sufficiently cooled, the mold segments 52 and 54 are moved apart and the panel 30 is removed. The panel 30 may be high density polyethylene (HDPE), thermoplastic olefin (TPO) or other suitably rugged and dimensionally stable thermoplastic material. It should be understood that the panel must be at an elevated temperature of several hundred degrees Fahrenheit before being placed in the mold segments 52 and 54. This may be achieved by utilizing the material promptly after it was extruded from a production extrusion machine (not illustrated) or reheating the panel 30 if it is at ambient temperature because it has been allowed to cool after its extrusion.

Figure 4:
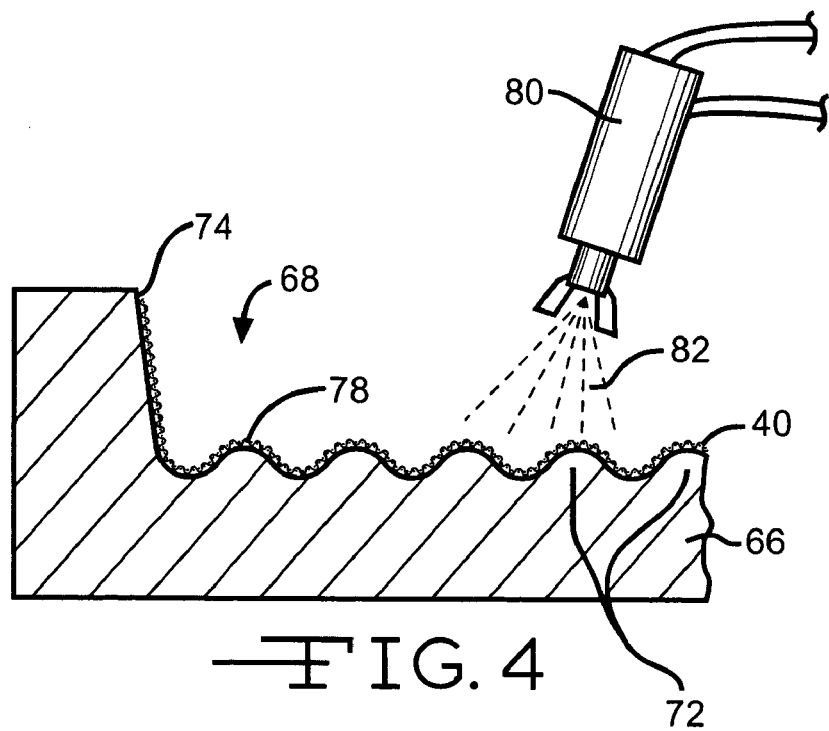
FIG. 4 is an enlarged, fragmentary, sectional view illustrating the application of plastic resin or binders to fibers or a fibrous mat to produce a second or lower panel according to the present invention.

Referring now to FIG. 4, the second or lower panel 40 is fabricated in a female mold or die 66 having a mold cavity surface 68 corresponding to the desired shape and configuration of the second or lower panel 40. As such, the female die 66 defines a plurality of elongate, parallel corrugations 72 and an oblique wall 74. A fibrous layer, strips, or a mat 78 of, for example, fiberglass or random strands of fiberglass, carbon fiber or other stable, fibrous reinforcing material is placed upon the mold surfaces 72 and 74. A single or multiple component spray head 80 is then translated over the surface of the female die 66, either manually or through the agency of a mechanical or robot arm (not illustrated) to apply suitable plastic or resin binder 82 to the fibrous layer or mat 78. If desired, multiple layers of fibers 78 and of plastic or resin binder 82 may be laid upon the female die 66.

After an appropriate time, the second or lower panel 40 may be removed from the female die 66 and after suitable drying or curing, the second or lower panel 40 is ready for assembly.

Figure 5:
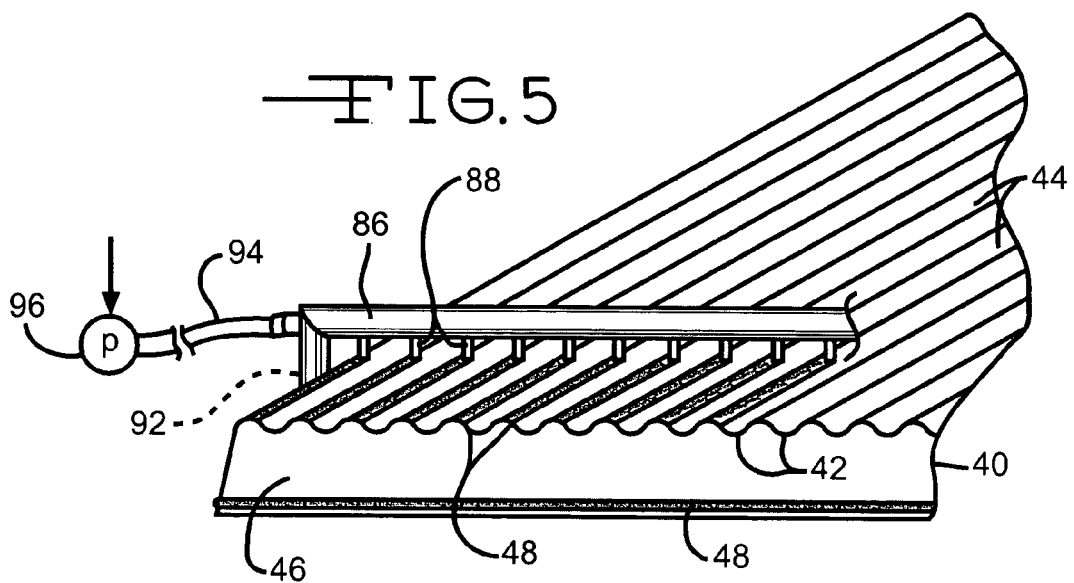
FIG. 5 is an enlarged, fragmentary sectional view illustrating the application of adhesive to the second or lower panel according to the present invention.

Referring now to FIG. 5, the adhesive 48 is preferably applied directly to the raised elongate surfaces 44 of the corrugations 42 by an elongate, horizontal adhesive distributing header 86 having a plurality of nozzles 88 spaced apart at distances equal to the spacing of the convolutions 42. The horizontal header 86 also includes a nozzle 92 which applies the adhesive 48 to the depending lip 46. The elongate header 86 is provided with the adhesive 48 through a flexible hose 94 from a suitable pump 96 and bulk source (not illustrated).

Figure 7:
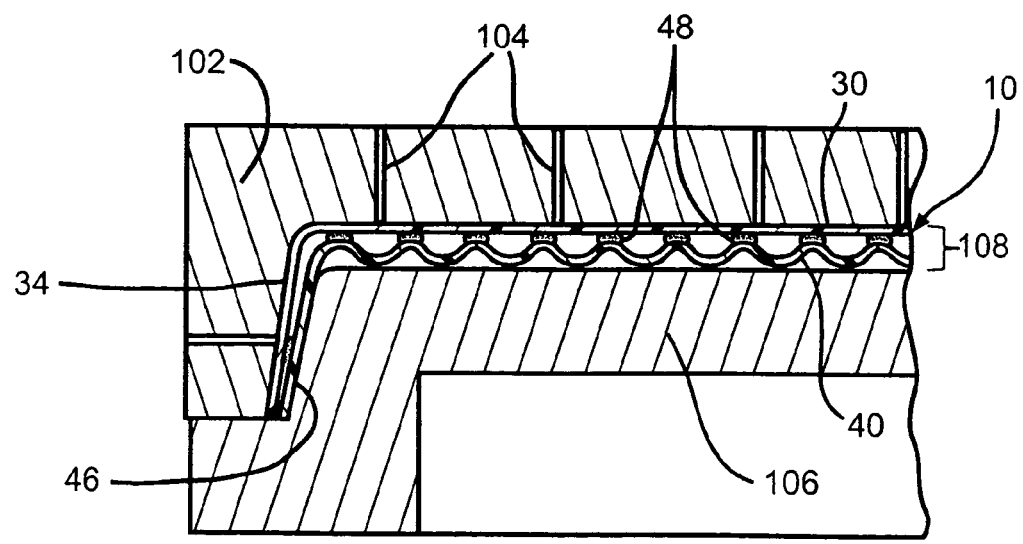
FIG. 7 is an enlarged, fragmentary, sectional view of a completed composite vehicle panel according to the present invention in a mold assembly.
Figure 6:
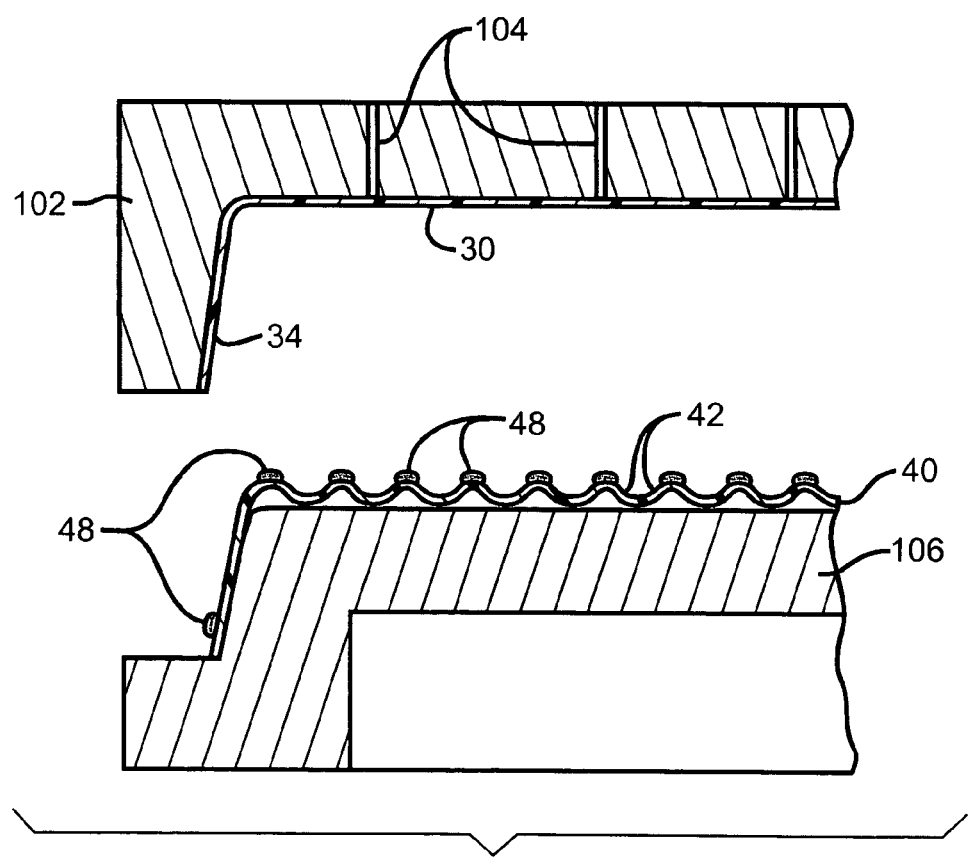
FIG. 6 is an enlarged, fragmentary, sectional view of two mold segments illustrating the final fabrication step of a composite vehicle panel according to the present invention.

Referring to FIGS. 6 and 7, subsequent to application of the adhesive 48 to the raised elongate surfaces 44 of the convolutions 42 and the exterior of the depending lip 46, the first or upper panel 30 and the second or lower panel 40 are placed within mating mold segments. The first or upper panel 30 is disposed within a female mold segment 102 and the second or lower panel 40 is disposed upon a male mold segment 106. The first or upper panel 30 may be retained in the first mold segment 102 by a partial vacuum provided through passageways 104 in accordance with conventional practice. As illustrated in FIG. 7, the mold segments 102 and 106 are brought together and define a mold cavity 108 having a height which engages the panels 30 and 40 and suitably compresses the adhesive 48 and intimately bonds the first or upper panel 30 to the second or lower panel 40. The mold segments 102 and 106 are then separated and the composite vehicle panel 10 is removed therefrom. Preferably, before the adhesive 48 has hardened, the U-shaped channel 50 illustrated in FIG. 2, is installed over the adjacent ends of the flanges or lips 34 and 46.

The foregoing disclosure is the best mode devised by the inventors for practicing this invention. It is apparent, however, that products and methods incorporating modifications and variations will be obvious to one skilled in the art of composite panels, tonneau covers and manufacturing processes therefore. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

What is claim is:

1. A composite panel for use on a motor vehicle comprising, a first panel having a planar center region and a first peripheral lip;

a second panel having a plurality of parallel corrugations and a second peripheral lip;

adhesive on the corrugations and lips for securing the panels together; and a U-shaped channel engaging a portion of the peripheral lips.

2. The composite panel for use on a motor vehicle of claim 1 wherein the first panel comprises thermoformed high density polyethylene.

3. The composite panel for use on a motor vehicle of claim 1 wherein the second panel comprises fiber-reinforced plastic.

4. The composite panel for use on a motor vehicle of claim 1 wherein the U-shaped channel comprises an elastomer.

5. The composite panel for use on a motor vehicle of claim 1 wherein the composite panel is configured for use as a tonneau cover.

6. A motor vehicle composite panel, comprising
a first panel comprising a thermoplastic having a planar center region, a lower surface and a depending flange extending about a periphery of the first panel;
a second panel comprising a thermoplastic having a plurality of parallel corrugations having raised elongate surfaces and a depending flange extending about a periphery of the second panel, wherein the lower surface of the first panel is secured to the raised elongate surfaces of the corrugations of the second panel and the depending flange of the first panel is secured to the depending flange of the second panel, wherein the motor vehicle composite panel is a tonneau cover.

7. The composite panel of claim 6, wherein the depending flange of the first panel and the depending flange of the second panel are secured by adhesive.

8. The composite panel of claim 6, wherein the raised elongate surfaces of the corrugations are secured to the lower surface of the first panel by an adhesive.

9. The motor vehicle panel of claim 6, further comprising a U-shaped, elasomeric channel disposed around a portion of the depending flange of the first panel and the depending flange of the second panel.

10. The motor vehicle composite panel of claim 6, wherein the first panel comprises high density polyethylene.

11. The motor vehicle composite panel of claim 6, wherein the second panel comprises a fiber-reinforced plastic.

* * * * *